US007536512B2

(12) United States Patent
Chetuparambil et al.

(10) Patent No.: US 7,536,512 B2
(45) Date of Patent: May 19, 2009

(54) METHOD AND APPARATUS FOR SPACE EFFICIENT IDENTIFICATION OF CANDIDATE OBJECTS FOR EVICTION FROM A LARGE CACHE

(75) Inventors: Madhu Chetuparambil, Raleigh, NC (US); Andrew C. Chow, Cary, NC (US); Andrew Ivory, Durham, NC (US); Nirmala Kodali, Glen Allen, VA (US)

(73) Assignee: International Business Machines Corporation, Armonk, NY (US)

( * ) Notice: Subject to any disclaimer, the term of this patent is extended or adjusted under 35 U.S.C. 154(b) by 328 days.

(21) Appl. No.: 11/531,818

(22) Filed: Sep. 14, 2006

(65) Prior Publication Data

US 2008/0071992 A1 Mar. 20, 2008

(51) Int. Cl.
*G06F 12/00* (2006.01)
(52) U.S. Cl. ............... 711/133; 711/131; 711/136; 711/141
(58) Field of Classification Search .......... 711/130, 711/133, 136, 141
See application file for complete search history.

(56) References Cited

U.S. PATENT DOCUMENTS

| 6,480,939 | B2 | 11/2002 | Anderson et al. ........... 711/137 |
| 6,718,438 | B2 | 4/2004 | Lewis ...................... 711/129 |
| 6,959,320 | B2 | 10/2005 | Shah et al. ................ 709/203 |
| 2005/0027943 | A1 | 2/2005 | Steere et al. .............. 711/133 |
| 2006/0143388 | A1* | 6/2006 | Wintergerst et al. ........ 711/130 |
| 2006/0143392 | A1* | 6/2006 | Petev et al. ............... 711/133 |
| 2006/0143393 | A1* | 6/2006 | Petev et al. ............... 711/133 |
| 2006/0143394 | A1* | 6/2006 | Petev et al. ............... 711/133 |
| 2006/0143399 | A1* | 6/2006 | Petev et al. ............... 711/136 |
| 2006/0248285 | A1* | 11/2006 | Petev ..................... 711/141 |

OTHER PUBLICATIONS

Psounis, Konstantinos,& Prabhakar, Balaji "Efficient Randomized Web-Cache Replacement Schemes Using Samples from Past Eviction Times", IEEE/ACM Transactions on Networking, vol. 10, No. 4, Aug. 2002, pp. 441-454.
Rodric, Rabbah & Palem, Krishna, "Data Remapping for Design Space Optimization of Embedded Memory Systems", ACM Transactions on Embedded Computing Systemes, vol. 2, No. 2, May 2003, pp. 186-218.

* cited by examiner

*Primary Examiner*—Gary J Portka
*Assistant Examiner*—Mehdi Namazi
(74) *Attorney, Agent, or Firm*—Yee & Associates, P.C.; A. Bruce Clay; Rudolf O. Siegesmund

(57) ABSTRACT

The eviction candidate sorting tool (ECST) is used with existing eviction algorithms that utilize a database for tracking objects stored in a cache. Rather than storing all the metadata associated with an object in a cache, the ECST extracts only certain attributes from the metadata, creating an "evict table" listing all the cached objects and the chosen attributes, or "classes." The table can be sorted by class based on an eviction algorithm. An eviction mechanism can use the sorted table to identify candidates for eviction.

2 Claims, 5 Drawing Sheets

METHOD AND APPARATUS FOR SPACE EFFICIENT IDENTIFICATION OF CANDIDATE OBJECTS FOR EVICTION FROM A LARGE CACHE

FIELD OF THE INVENTION

The present invention relates generally to memory in electrical computers and digital processing systems and specifically to identifying objects for eviction from a cache.

BACKGROUND OF THE INVENTION

Applications are programs that perform tasks on a computer. Applications save objects on a computer to cache for many reasons. Applications usually save objects to cache on a storage device so that the application can quickly access the object at a subsequent time. Objects placed in cache by an application may be used over and over again, or their use may be temporary in nature. An example of an object placed in cache that would be used over and over again is an object file containing login information for an e-mail reader. An example of an object placed in cache that would be temporary in nature is an image appearing on a rarely accessed Web page, or appearing in a rarely accessed streaming video broadcast. In the case of a rarely accessed Web page, or a streaming video broadcast, once the temporary cached object has been viewed, the viewer moves on to something else, and may never view that object again. Both objects cached for ongoing use and objects cached for temporary use take up volatile memory and persistent storage space. By taking up volatile memory and persistent storage space, the cached objects degrade the overall performance of the computer system. Various programs, algorithms, or routines (hereafter programs) exist to improve computer system performance by automatically removing unneeded files from the cache.

Persons skilled in the art refer to programs that automatically remove unneeded files from a cache as eviction programs. Other names for eviction programs are cache cleaning programs and garbage collection programs. As used herein, the term eviction program shall mean any program, algorithm, or routine that automatically removes objects from a cache in which the objects are stores. The simplest eviction program deletes the oldest object from the cache when more room is required in the cache. More elaborate eviction programs identify and delete unnecessary objects, while retaining useful objects in the cache. The more elaborate eviction programs fall into two categories: I/O feedback eviction programs and database tracking eviction programs.

I/O Feedback eviction programs monitor input/output (I/O) operations during the eviction of one object and use feedback from the evicted object to identify candidate objects to be evicted later. U.S. Pat. No. 6,718,438 is one example of a feedback eviction program that uses feedback from evicted candidates to identify new candidates. Another form of I/O feedback eviction programs reorganizes the cache whenever an object is fetched or updated to allow for faster access to objects identified for eviction. Reorganizing the cache may involve moving a cached object from one storage medium to another storage medium. U.S. Pat. No. 6,480,939 discloses a method of filtering fetches to enhance eviction of cached objects. I/O feedback eviction programs consume both computer hardware and software resources to identify and evict objects from cache.

Database tracking eviction programs, that use a database to track and delete objects in a cache, have an advantage over feedback eviction programs because fewer hardware resources are required to maintain the cache. The database tracking eviction program catalogs metadata related to the objects in the cache, and reorganizes and reprioritizes the list of objects in the cache without reorganizing the cached objects themselves on the storage device.

Database tracking eviction programs use attributes from the object's metadata to identify eviction candidates. A commonly used attribute for determining eviction candidates is the age of the object. Other attributes in the object's metadata that can be used in eviction determinations include the creator of the object, the time of last use, or the object type. Attributes in the object's metadata can indicate that the object is useful and should not be deleted. Although database tracking eviction programs do not require I/O hardware overhead of the I/O feedback eviction programs, the database tracking eviction programs consume extensive memory resources as the size of the cache grows. The memory use of the database tracking eviction program ultimately degrades the performance of the computer system. Therefore, a need exists for a method to reduce the memory requirements of database tracking eviction programs.

SUMMARY OF THE INVENTION

The invention meeting the need identified above is the "eviction candidate sorting tool" ("ECST") having a configuration component, a table entry component, a sort component, and an eviction component. The ECST works in conjunction with an eviction mechanism, a configuration file, an evict entry table, and a disk location table.

ECST stores the location of the cached object in a separate "disk location table." The sorted entry in the evict entry table maps to a corresponding disk location table entry, to facilitate locating the object. The configuration component allows an administrator to set or change values for the configuration file, the evict entry table, and the disk location table. The table entry component extracts the relevant attributes from the metadata of an object and enters the attributes of the object defining the object and a set of objects that share the same attributes in the evict entry table and in the disk location table. Sort component reorders the entries in the evict entry table in accordance with the sort criteria in the configuration file. The eviction component selects, as a candidate for eviction, the first entry in the previously sorted evict entry table, references a mapped entry to the disk location table to locate the first of a set of candidate objects in the cache, compares the metadata of the object to the eviction criteria of the eviction mechanism, and if the criteria is met, sends the identity of the object to the eviction mechanism for deletion.

BRIEF DESCRIPTION OF DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

DETAILED DESCRIPTION OF THE PREFERRED EMBODIMENT

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory. The term "computer software" or "software," refers to any set of instructions operable to cause computer hardware to perform an operation. A "computer," as that term is used herein, includes without limitation any useful combination of hardware and software, and a "computer program" or "program " includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described best, though, as a single computer program that configures and enables one or more general-purpose computers to implement the novel aspects of the invention. For illustrative purposes, the inventive computer program will be referred to as the Eviction Candidate Sorting Tool" (ECST).

Figure 1:
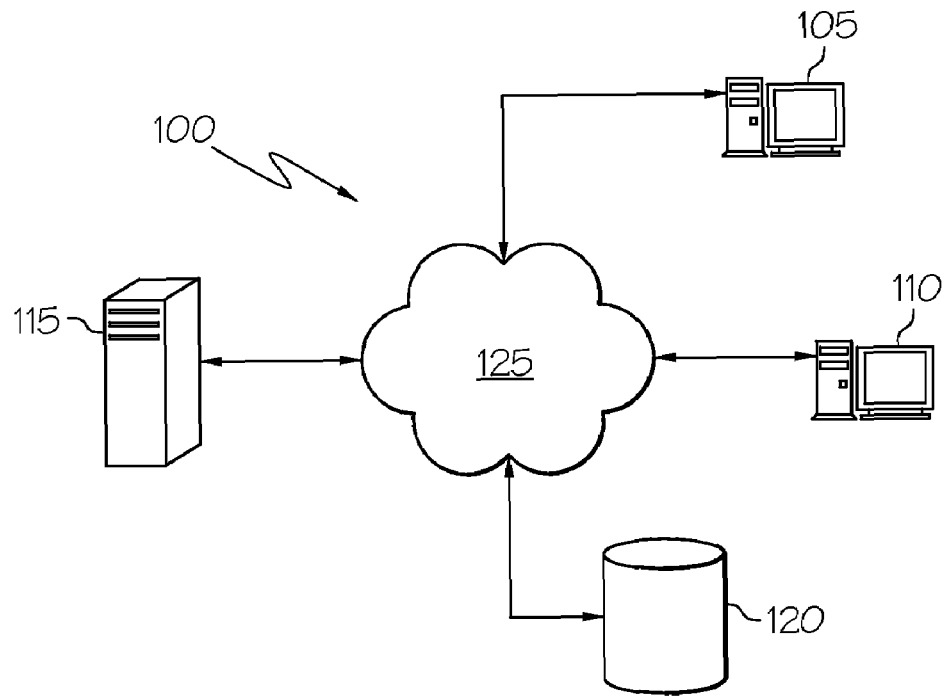
FIG. 1 is an exemplary computer network.

Additionally, the ECST is described below with reference to an exemplary network of hardware devices, as depicted in FIG. 1. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 100 has only a limited number of nodes, including workstation computer 105, workstation computer 110, server computer 115, and persistent storage 120. Network connection 125 comprises all hardware, software, and communications media necessary to enable communication between network nodes 105-120. Unless otherwise indicated in context below, all network nodes use publicly available protocols or messaging services to communicate with each other through network connection 125.

Figure 2:
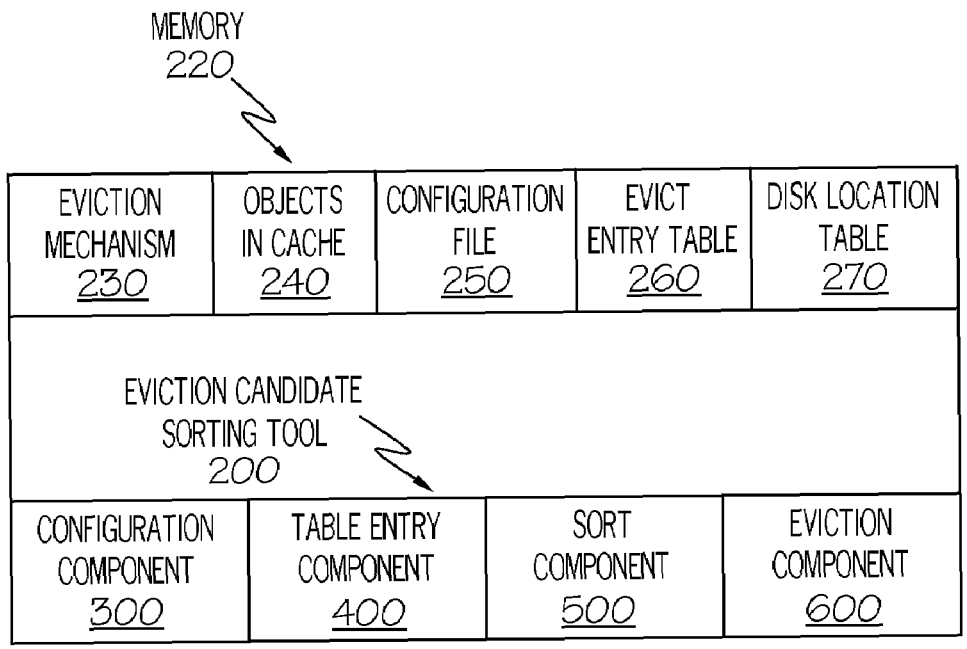
FIG. 2 describes programs and files in a memory on a computer.

ECST 200 typically is stored in a memory, represented schematically as memory 220 in FIG. 2. The term "memory," as used herein, includes without limitation any volatile or persistent medium, such as an electrical circuit, magnetic disk, or optical disk, in which a computer can store data or software for any duration. A single memory may encompass and be distributed across a plurality of media. Further ECST 200 may reside in more than one memory distributed across different computers, servers, logical partitions or other hardware devices. The elements depicted in memory 220 may be located in or distributed across separate memories in any combination, and ECST 200 may be adapted to identify, locate and access any of the elements and coordinate actions, if any, by the distributed elements. Thus, FIG. 2 is included merely as a descriptive expedient and does not necessarily reflect any particular physical embodiment of memory 220. As depicted in FIG. 2, though, memory 220 may include additional data and programs. Of particular import ECST 200, memory 220 may include eviction mechanism 230, objects in cache 240, configuration file 250, evict entry table 260 and disk location table 270 with which ECST 200 interacts. ECST 200 has four components: configuration component 300, table entry component 400, sort component 500 and eviction component 600. Eviction mechanism 230 exists in the art, and is not disclosed here. Eviction mechanism 230 includes without limitation known database tracking eviction programs, algorithms, routines or subroutines. Eviction mechanism 230 is adapted to communicate with the various components of ECST 200, particularly by asking eviction component 600 to identify candidate objects 240 to remove from cache.

Figure 3:
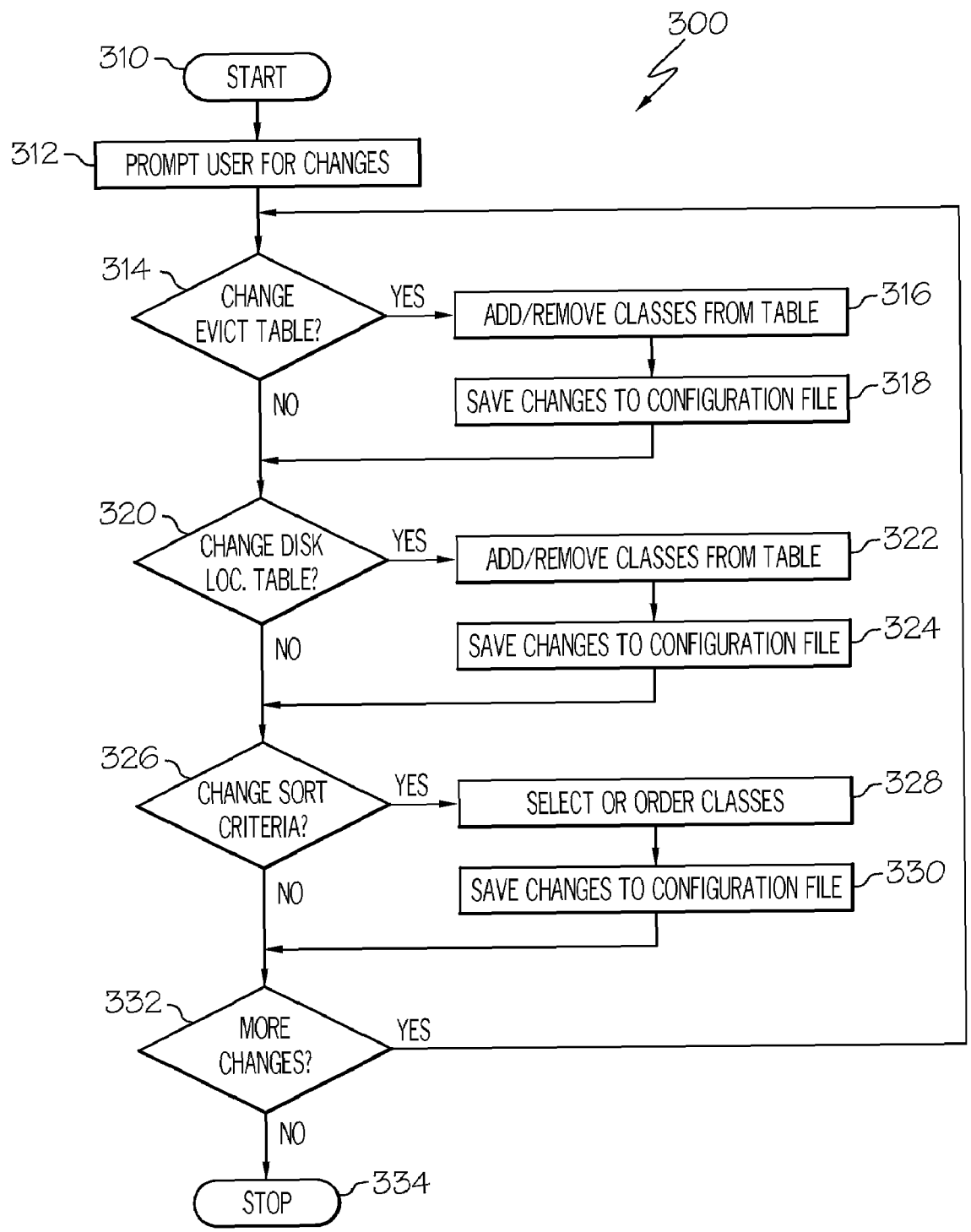
FIG. 3 is a flowchart of a Configuration Component.

FIG. 3 shows configuration component 300 started by a computer system administrator (310). Configuration component 300 provides prompts for the administrator to made changes (321). The prompts may be text in a data file or may include graphical representations such as radio buttons or drop down menus. If the administrator wants to change the settings of evict entry table 260 (314), classes are added or removed from the table (316) and the changes are saved to configuration file 250 (318). Classes fields in a database table, in this case a class corresponds to specific object metadata attribute. Classes selected for evict entry table 260 should only include those object metadata attributes necessary to identify candidates for eviction. If the administrator wants to change the settings of disk location table 270 (320), classes are added or removed from the table (322) and the changes are save to configuration file 250 (324). Classes selected for disk location table 270 should only include those object metadata attributes necessary to locate identified candidates for eviction. If the administrator wants to change the sort criteria (326), classes are added, removed or reordered (328) and the changes are save to configuration file 250 (330). Classes and sort order selected for the sort criteria should match as close as possible the eviction algorithm used by eviction mechanism 230. If the administrator is finished making configuration changes (332), configuration component 300 stops (334). An embodiment of configuration component 300 automatically configures itself based on the settings used by eviction mechanism 230.

Figure 4:
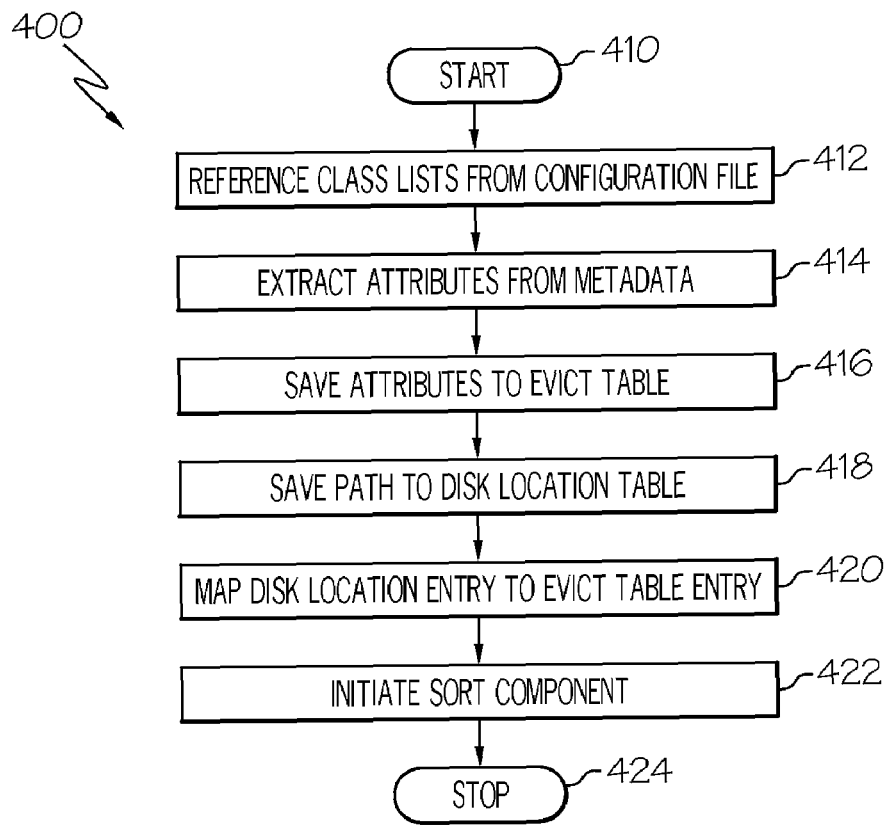
FIG. 4 is a flowchart of a Table Entry Component.

Table entry component 400, shown in FIG. 4, starts whenever an object 240 is saved to cache (410). Table entry component 400 references the class settings for evict entry table 260 and disk location table 270 from Configuration file 250 (412). Table entry component 400, extracts the relevant attributes such as a hashed identifier, file size or last access time from the metadata of object 240 (414) and enters the attributes as classes in evict entry table 260 (416) and disk location table 270 (418). A set of objects sharing the same attributes can be included in the same class in evict entry table 260. The entry from disk location table 270 is mapped to the entry of evict entry table 260 (420) using a disk location identifier. After initiating sort component 500 (422), table entry component 400 stops (424).

Figure 5:
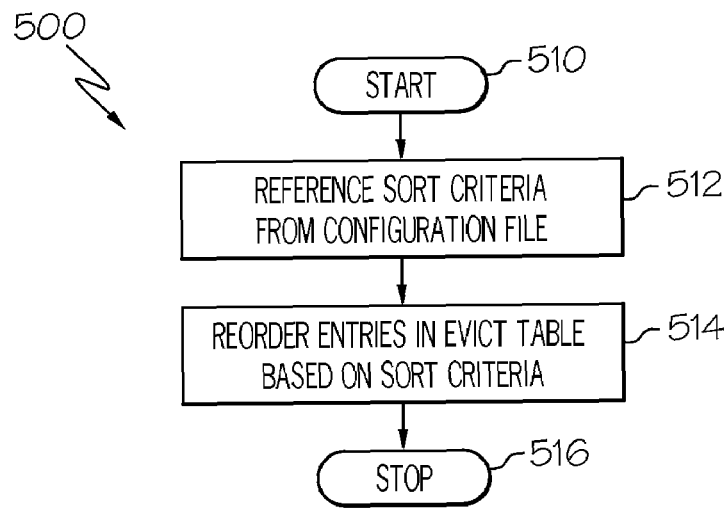
FIG. 5 is a flowchart of a Sort Component.

Referring to FIG. 5, Sort component 500 starts when initiated by table entry component 400 or eviction component 600 (510). Sort component 500 may also start when initiated by eviction mechanism 230. Sort component 500 references the sort criteria saved in configuration file 250 (512), reorders the entries in evict entry table 260 based on the sort criteria (514) then stops (516).

Figure 6:
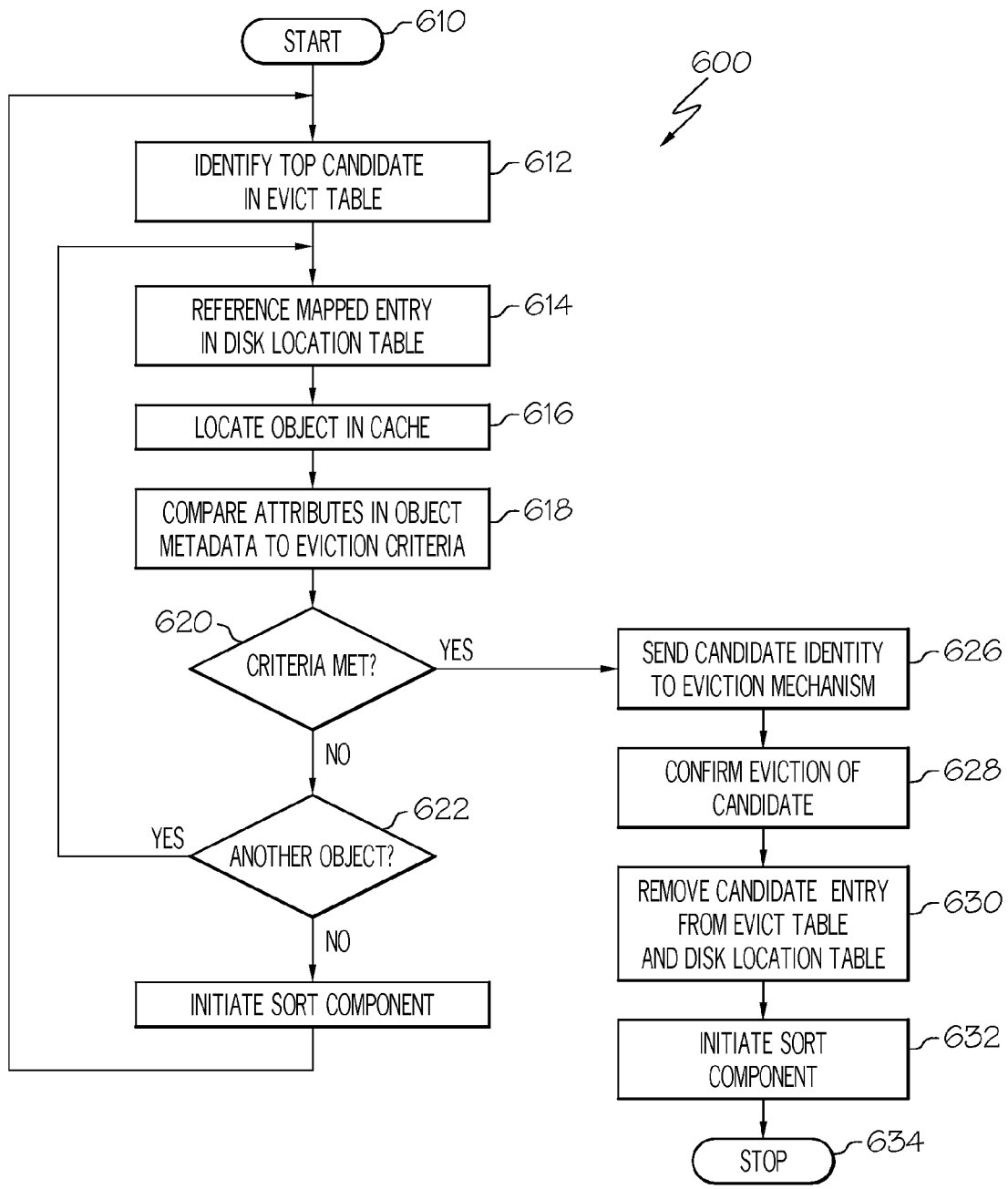
FIG. 6 is a flowchart of a Eviction Component.

Referring to FIG. 6, eviction component 600 starts when eviction mechanism 230 indicates a need for the identity of candidates to delete from cache (610). Eviction component 600 identifies a candidate for eviction by selecting the first entry in a previously sorted evict entry table 260 (612). Eviction component 600 references the mapped entry to disk location table 270 (614) to locate the object 240 in the cache (616). Eviction component 600 compares metadata attributes of the object in object cache 240 to the eviction criteria used by eviction mechanism 230 (618). If the eviction criteria is not met (620), eviction component 600 determines if another object in disk that shares the same set of attributes as object 240 (622) and repeats the process of verifying whether the other object meets the eviction criteria (614-620). If at step 622, another object does not share the same set of attributes, eviction component 600 initiates sort component 500 (624) and repeats the process of identifying and verifying a new eviction candidate (612-620). If the eviction criteria is met by object 240 in cache, the identity of the object is sent to eviction mechanism 230 for deletion (626). Eviction component 600 confirms eviction of the candidate (628) and removes the corresponding entries from evict entry table 260 and disk location table 270 (630). Eviction component 600 initiates sort component 500 (632) to reorder the remaining entries, and then stops (634).

Figure 7:
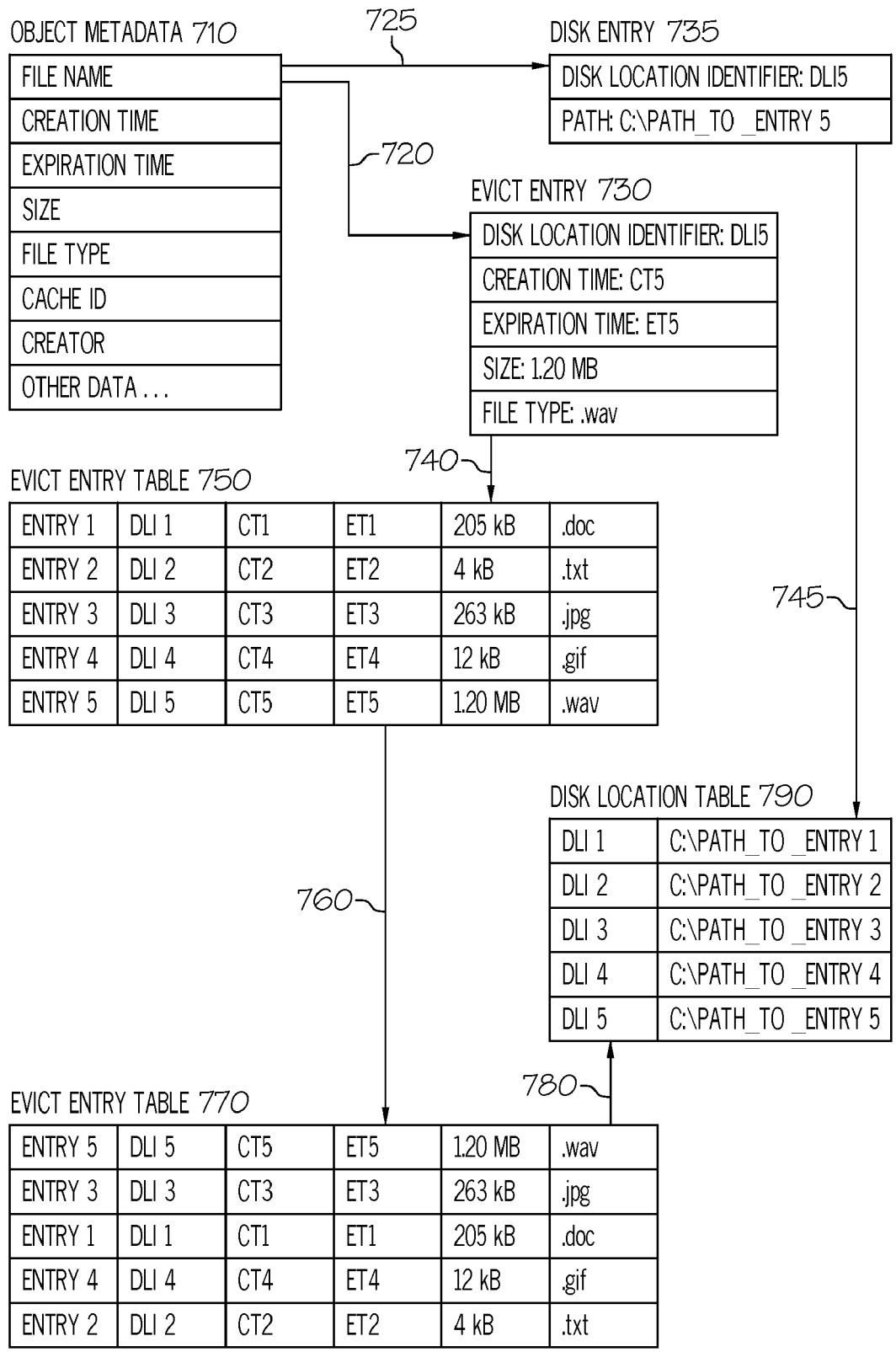
FIG. 7 is an example of tables used by the invention.

FIG. 7 depicts an example of ECST 200 interacting with evict entry table 260 and disk location table 270. Object metadata 710 is an example of metadata associated with an object in cache 240. First arrow 720 represents table entry component 400 extracting certain classes of attributes from object metadata 710, and the extracted attributes are shown as evict entry 730. The extracted attributes include the creation time "CT5," expiration time "ET5," size "1.20 MB" and file type ".wav." Object in cache 240 is assigned to disk location identifier "DLI5." Second arrow 725 represents table entry component 400 extracting physical location attributes from object metadata 710, shown in FIG. 7 as disk entry 735. Third arrow 740 represents table entry component 400 placing evict entry 730 into evict entry table 750 as Entry 5. Evict entry table 750 contains previously placed entries (Entry 1-Entry 4) with extracted attributes corresponding to other cached objects. Fourth arrow 745 represents table entry component 400 placing disk entry 735 into disk location table 790. Disk location table 790 contains previously placed entries describing the location of other cached objects. Fifth arrow 760 represents sort component 500 reordering the entries in evict entry table 750 based on file size. The reordered table is shown as evict entry table 770. Sixth arrow 780 represents eviction component 600 referencing the physical location of object in cache 240 in disk location table 790. ECST 200 passes the identity of object in cache 240 to eviction mechanism 230 for deletion.

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. A computer implemented process for cataloging metadata of objects in a cache, the computer implemented process comprising:
    defining an eviction criteria for deleting an object from a cache;
    identifying a first plurality of eviction attributes corresponding to the eviction criteria;
    extracting the first plurality of eviction attributes from a second plurality of metadata of a third plurality of objects in the cache;
    entering the first plurality of eviction attributes into an evict entry table;
    responsive to entering the first plurality of eviction attributes into the evict entry table and using the plurality of disk location identifiers, mapping each disk location table entry to an evict table entry;
    sorting the evict table based on a sort criteria;
    identifying a candidate object for eviction from a sorted evict entry table by selecting a first entry in the sorted evict entry table;
    responsive to identifying the candidate object for eviction and using the disk location table to locate the candidate object in the cache, comparing the metadata of the candidate object to the eviction criteria used by the eviction mechanism;
    responsive to the eviction criteria being met by the candidate object, sending the identity of the candidate object to the eviction mechanism for deletion;
    responsive to the eviction mechanism deleting the candidate object, confirming the eviction of the candidate object and removing all corresponding entries from the evict entry table and the disk location table.

2. A computer implemented process for evicting a candidate object from a cache, the computer implemented process comprising:
    saving a plurality of objects to cache;
    using a plurality of disk location identifiers assigned to the plurality of objects, storing the location of each of the plurality of objects in a disk location table;
    responsive to an input by an administrator, setting a plurality of values for a configuration file, an evict entry table, and the disk location table;
    referencing the settings for the evict entry table and the disk location table, extracting a plurality of relevant attributes from a plurality of metadata of each of the plurality of objects, and entering the plurality of relevant attributes in the evict entry table;
    mapping each entry in the evict entry table to the disk location table using the plurality of disk location identifiers;
    reordering the entries in the evict entry table in accordance with a sort criteria in the configuration file;
    selecting, as a candidate for eviction, the first entry in a previously sorted evict entry table;
    referencing a mapped entry to the disk location table to locate the candidate object in the cache;
    comparing a metadata of the candidate object from the cache to an eviction criteria used by the eviction mechanism;
    responsive to the eviction criteria not being met, repeating the process of verifying whether a next entry in the evict entry table meets the eviction criteria;
    responsive to the eviction criteria being met by the candidate object, sending the identity of the candidate object to the eviction mechanism for deletion;
    responsive to the eviction mechanism deleting the candidate object, confirming an eviction of the candidate object and removing each corresponding entry from the evict entry table and the disk location table; and
    reordering any remaining entries in the evict entry table.

* * * * *